United States Patent
Hanafin et al.

[11] Patent Number: 6,096,812
[45] Date of Patent: Aug. 1, 2000

[54] LOW DENSITY, LIGHT WEIGHT INTUMESCENT COATING

[75] Inventors: Joseph W. Hanafin, Marlborough, Mass.; David C. Bertrand, Nashua, N.H.

[73] Assignee: Textron Systems Corporation, Wilmington, Mass.

[21] Appl. No.: 08/999,536

[22] Filed: Sep. 23, 1997

Related U.S. Application Data

[60] Provisional application No. 60/026,539, Sep. 23, 1996.

[51] Int. Cl.[7] .................................................. C08K 5/3492
[52] U.S. Cl. ........................ 524/100; 524/127; 524/141; 524/424; 524/492; 524/494; 428/413
[58] Field of Search .............................. 428/413; 524/100, 524/127, 141, 424, 492, 494, 101

[56] References Cited

U.S. PATENT DOCUMENTS

| | | | |
|---|---|---|---|
| 4,529,467 | 7/1985 | Ward et al. | 156/307.3 |
| 5,070,119 | 12/1991 | Nugent, Jr. et al. | 523/179 |
| 5,204,392 | 4/1993 | Nalepa et al. | 524/101 |
| 5,532,292 | 7/1996 | Wainwright et al. | 523/179 |
| 5,580,648 | 12/1996 | Castle et al. | 428/247 |

FOREIGN PATENT DOCUMENTS

| | | |
|---|---|---|
| 1 476 238 | 6/1977 | United Kingdom . |
| 2 121 056 | 12/1983 | United Kingdom . |
| 2 171 105 | 8/1986 | United Kingdom . |
| 2 269 548 | 2/1994 | United Kingdom . |

*Primary Examiner*—Kriellion Sanders
*Attorney, Agent, or Firm*—Hamilton, Brook, Smith & Reynolds, P.C.

[57] ABSTRACT

A low density, epoxy-based intumescent fire resistive coating, having a density below about 1.10 grams/cc, and most preferably below about 1.0 grams/cc, and a method for forming the same, are disclosed. This method includes the steps of forming an epoxy-based intumescent mastic, having minute particles of amorphous silica dispersed therein. The mastic is then sprayed in droplets on at least one surface of a substrate to form a low density mastic coating on the surface. The low density mastic coating then cures to form a low density, intumescent fire resistive coating. Preferably, the method of invention further includes the step of dispersing at least one type of gas within the mastic, or within at least one part of the mastic to further reduce the density of the cured intumescent coating.

25 Claims, 1 Drawing Sheet

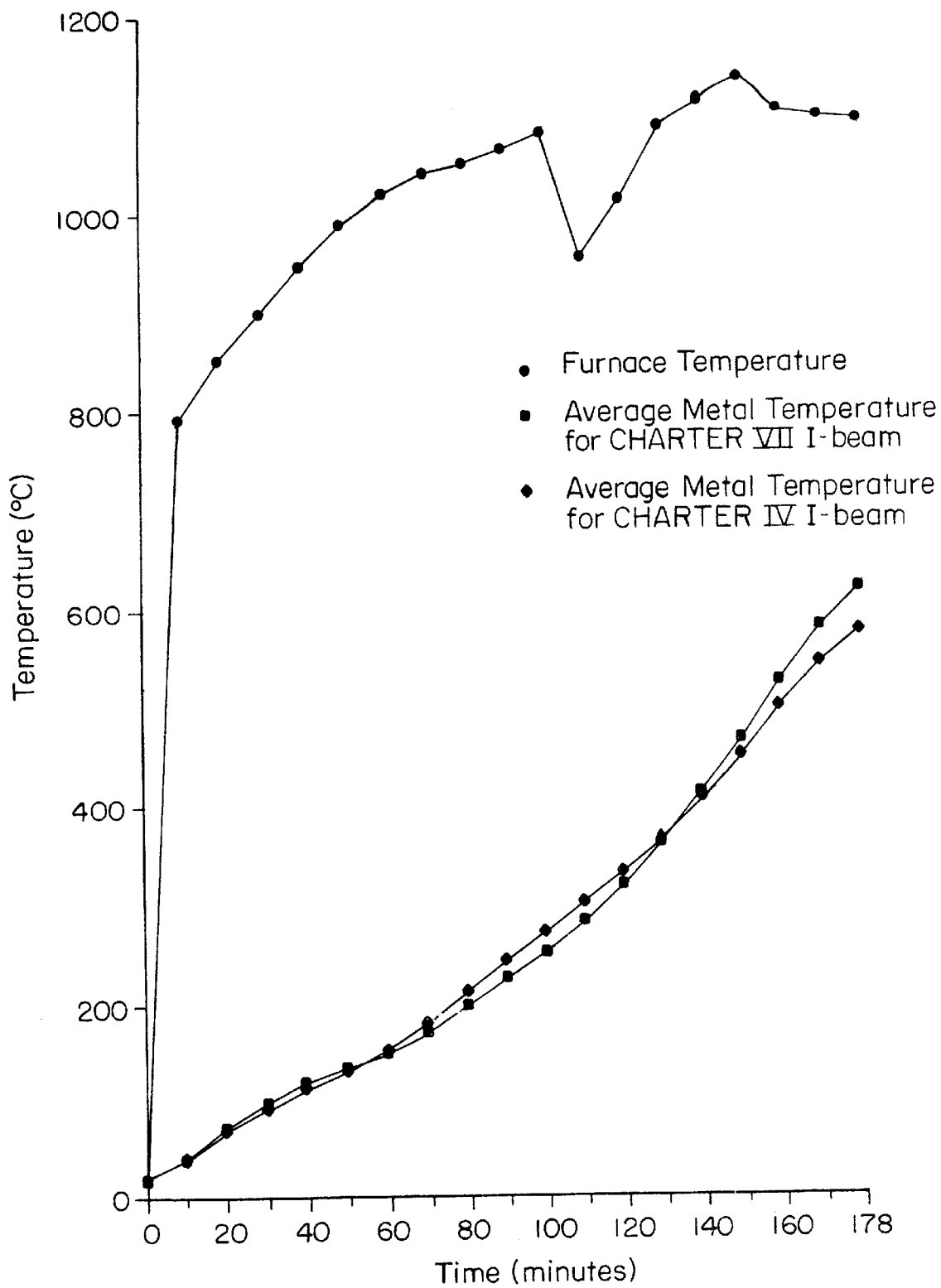

LOW DENSITY, LIGHT WEIGHT INTUMESCENT COATING

RELATED APPLICATIONS

This application claims the benefit of U.S. Provisional Application No. 60/026,539, filed Sep. 23, 1996, the teachings of which are incorporated herein, in their entirety, by reference.

BACKGROUND OF THE INVENTION

Intumescent fire resistive coatings are commonly used on metal components (e.g., structures and systems) to insulate these components from the heat generated in a fire. By insulating metal components, the rate of temperature increase experienced by these components from a fire is substantially reduced. Thus, this insulation imparts additional time for the application of fire suppression and/or cooling to the coated component to reduce the potential for a material failure of the component.

These intumescent fire resistive coatings have been particularly useful on ships, oil platforms and other hydrocarbon storage and processing facilities. Typically, however, to sufficiently insulate metal components against fire, large masses of coating must be applied which significantly increase the weight load on the coated component. This increased weight load imposes structural and economic liabilities. For instance, oil platforms are limited by the total weight load on the platform. A heavy mass of intumescent coating applied to the platform reduces the weight of other structures, equipment and manning that can be safely supported by the platform.

Therefore, a need exists for an intumescent coating that provides suitable fire resistance to coated metal components at a lower weight loading.

SUMMARY OF THE INVENTION

This invention relates to a low density, epoxy-based intumescent fire resistive coating and a method for forming the same. A low density coating of the present invention has a density lower than about 1.10 grams/cc, preferably about 1.05 grams/cc or less, and more preferably about 1.0 grams/cc or less.

This method includes forming an epoxy-based intumescent mastic, having minute particles of amorphous silica dispersed therein, and then applying the mastic to at least one surface of a substrate to form a low density mastic coating on the surface. The low density mastic coating then cures to form a low density, intumescent fire resistive coating. Preferably, the method of invention further includes the step of dispersing at least one type of gas within the mastic, or within at least one part of the mastic. to further reduce the density of the cured intumescent coating.

This method can also be used to reduce the density of other epoxy-based intumescent fire resistive coatings.

The epoxy-based intumescent mastic, used in the method of this invention, includes at least one epoxy resin, at least one epoxy curing agent, and also minute particles of amorphous silica. This mastic also includes at least one char-forming agent (or intumescent catalyst) and at least one spumific agent. In a preferred embodiment, the mastic also contains at least one gas dispersed therein.

This invention has the advantage that it substantially reduces the weight of intumescent, fire resistive coating required to adequately insulate a structure or system. The reduced density intumescent coating of this invention provides an equivalent degree of fire resistivity (insulation) as is provided by an equal coating thickness of denser intumescent coatings.

This invention also has the advantage of reducing the density of known intumescent coatings without reducing the effectiveness of the coating in resisting fire.

BRIEF DESCRIPTION OF THE DRAWINGS

The FIGURE is a plot of the results of the heat resistance testing described in Example 6, showing over time the (a) furnace temperature, (b) average thermocouple temperature of a steel I-beam coated with an average thickness of 15 mm of an intumescent fire resistive coating that does not contain a dispersion of minute silica particles (CHARTEK™ IV) heated within the furnace and (c) average thermocouple temperature of a steel I-beam coated with an average thickness of 15 mm of a similar intumescent fire resistive coating that does contain a dispersion of minute silica particles (CHARTEK™ VII) heated within the furnace.

DETAILED DESCRIPTION OF THE INVENTION

A low density, epoxy-based intumescent fire resistive coating of the present invention typically has a density between about 1.05 grams/cc and about 0.8 grams/cc. Said intumscent coating is formed by curing a suitable epoxy-based mastic which also contains minute particles of amorphous silica dispersed therein to thereby reduce the density of the intumescent coating.

Preferably, the mastic also contains at least one type of gas dispersed therein to further reduce the density of the intumescent coating.

Suitable epoxy-based mastics typically contain a substantially homogeneous mixture of (1) at least one type of epoxy resin which functions as a binder, (2) at least one char-forming agent, (3) at least one spumific, and (4) at least one epoxy curing agent. Examples of such epoxy-based mastics include the mastic described herein in Examples 1–3, and also other epoxy-based intumescent mastics known in the art, such as the CHARTEK™ IV epoxy-based mastic (sold by the Textron Systems Corporation, Wilmington, Mass.).

Minute particles of amorphous silica, which are dispresed in the mastic, are amorphous silica particles having particle diameters usually of about one micron or less. Examples of suitable minute silica particles include flame silica, arc silica, precipitated silica and other colloidal silicas. Preferably, the minute silica particles are particles of fumed silica. More preferably, the fumed silica is a surface treated silica, for instance a silica treated with dimethyldichlorosilane or hexamethyldisilazane. Most preferably, the amorphous silica particles are polydimethylsiloxane oil-treated fumed silica particles.

In the method and low density intumescent coating of the present invention, the epoxy-based mastic contains a substantially homogeneous dispersion of amorphous silica particles to reduce the density of the intumescent coating formed from the mastic. Specifically, the intumescent coating density, obtained from an epoxy-based mastic, is reduced by the inclusion of minute silica particles in the mastic. This density reduction is demonstrated in Example 4 for the epoxy-based CHARTEK™ IV mastic, wherein the densities of both trowel-applied and spray-applied mastic were reduced by adding fumed silica to the mastic.

Though not certain, it is believed that this reduction in intumescent coating density is caused by an increase in the amount of gases (e.g., air) contained in the mastic coating such as in the form of small bubbles. A significant portion of the contained gases are then retained within the mastic coating as it cures to thereby form a reduced density, or low density, fire resistive intumescent coating. It is further believed that the increase in amount of retained gases results from increased hydrogen bonding networks, between the silica particles and the polar groups of the epoxy resin and other polar components contained in the mastic, thereby increasing the thixotropy and viscosity of the mastic, and/or from mechanically entrapping air in the mastic.

The minimum content of amorphous silica particles contained in the mastic is an amount which would result in an intumescent coating having a reduced density when the coating is formed according to the method of this invention. The maximum content of silica particles is that above which the mastic becomes too viscous for spray application. The silica particle content should be adjusted for changes in particle diameter, as larger diameter particles have less surface area for bonding per unit mass than do smaller particles. Thus, larger diameter silica particles typically require a greater weight content of silica particles.

Preferably, an epoxy-based mastic contains between about 0.1 and about 10 weight percent amorphous silica particles. More preferably, the silica content in the mastic is between about 0.5 and about 5.0 weight percent of silica particles having a surface area between about 50 and 500 $m^2/g$. Also, it is preferred that the particle size of the silicon particles be between about 3 to about 500 nanometers.

In a more preferred embodiment, the epoxy-based mastic further contains at least one additional silicon-containing component, such as at least one type of expanded glass, hollow glass microspheres, and/or amorphous mineral fibers. It is believed that a dispersion of these additional silicon-containing components within the mastic will further increase the hydrogen-bonding network, thus further enhancing gas retention in the mastic prior to and during curing.

In a most preferred embodiment of the present invention, at least one type of gas, for example, air or nitrogen, is dispersed within the mastic. Specifically, the gas can be added directly into the mastic and/or to one or more of its separate parts (e.g., the mastic parts described in Examples 1 and 2). One suitable means to add gas to the mastic is by stirring each part of the mastic within a gas pressurized container just before applying the mastic, such as by the method described in Example 5.

It is not certain whether the gas dispersed within the mastic (or its parts) is dissolved and/or is in the form of small gas bubbles. Gas bubbles within the intumescent coating should be of a size that will not significantly degrade the structural integrity, the fire resistivity, or the moisture resistance of said coating.

Preferably, the mastic should contain an amount of gas dispersed therein that would result in an intumescent coating, formed from the mastic, having a reduced density due to increasing the porosity of the coating and/or gas dissolved within the coating.

For the epoxy-based mastic of the present invention, suitable epoxy resins include aliphatic, aromatic, cyclic, acyclic, alicyclic and/or heterocyclic epoxy resins. For instance, epoxy resins may be glycidyl ethers derived from such polyhydric alcohols as ethylene glycol, diethylene glycol, triethylene glycol, 1,2-propylene glycol, 1,4-butylene glycol, 1,5-pentanediol, 1,2,6-hexanetriol; glycerol, trimethylolpropane, and Bisphenol-F (a condensation product of phenol and formaldehyde). The epoxy resin of the present invention can include mixtures of different epoxy resins.

The preferred epoxy resin is (2,2-bis[4-(2,3, -epoxy propoxy) phenyl]propane, commonly called the diglycidyl ether of bisphenol A (hereinafter DGEBA).

The epoxy-based mastic also includes at least one epoxy curing agent, also known as a hardener. The curing agent reacts with the epoxy resin to cross-link the resin and form a hard, durable material. Typically, any curing agents used to harden epoxy resins can be used in this invention. Examples of suitable curing agents can include, for instance, diethylene triamine, 3,3-amino bis propylamine, triethylene tetraamine, tetraethylene pentamine,m-xylenediamine, di-carboxylic acid, tri-carboxylic acid, oxalic acid, phthalic acid, terephthalic acid, succinic acid, substituted succinic acids, tartaric acid, polymerized fatty acids, pyromellitic anhydride, trimellitic anhydride, phthalic anhydride, succinic anhydride, maleic anhydride.

The epoxy-based mastic of the present invention further contains one or more chemical constituents which function within the fire resistive coating as a char-forming agent and as a spumific. A char-forming agent promotes the formation of a char when the intumescent coating is exposed to fire, typically by acting as a fire retardant which controls the rate and mechanism of thermal decomposition of the cured epoxy, resulting in the formation of a carbonaceous char instead of carbon monoxide, carbon dioxide and water. Suitable char-forming agents include, for instance, fire retardants containing phosphorous, isocyanurates and/or halogens.

Phosphorous-containing fire retardants, suitable as char-forming agents, include, for instance, phosphate, phosphite, phosphonate, and/or phosphonium groups. Specific examples of such phosphorous-containing fire retardants include ammonium polyphosphate, tricresyl phosphate, tris (2,3-dibromo-propyl) phosphate, triphenyl phosphate, trioctyl phosphate, ammonium phosphate, tris (2,3-dichloropropyl) phosphate, poly-β-chloroethyl triphosphonate mixture, tetrakis (hydroxymethyl) phosphonium sulfide, diethyl-N,N-bis (2-hydroxyethyl-aminomethyl) phosphonate, hydroxyalkyl esters of phosphoros acids and tris(2-chloroethyl) phosphate.

Examples of suitable isocyanurate-containing fire retardants, suitable as char-forming agents, include polyisocyanurate, an ester of isocyanuric acid, an isocyanurate and hydroxyalkyl isocyanurates, such as tris (hydroxymethyl) isocyanurate, tris(3-hydroxy-n-propyl) isocyanurate, triglycidyl isocyanurate, and tris-(2-hydroxyethyl)isocyanurate (hereafter THEIC).

Other char-forming agents can also be used, such as melamine, zinc borate, or antimony oxide.

Typically, the weight ratio of char-forming agent (or a mixture of such agents)-to-epoxy resins in the mastic is usually between about 1:4 to about 1:1, and is preferably between about 1:2 to 1:1.

In a preferred embodiment, at least two fire retardants, one of which contains phosphorous are dispersed within the mastic.

Suitable halogen-containing fire retardants include, for instance, chlorinated paraffins, octabromodiphenyl ether, hexachlorocyclopentadiene derivatives, tris(2,3-dibromopropyl) phosphate, chlorendic acid, tetrachlorophthalic acid, tetrabromophthalic acid, bis-(N,N'-hydroxyethyl) tetrachlorophenylene diamine, tetrabromobisphenol A, or tris(2-chloroethyl) phosphate.

In an even more preferred embodiment, the low density, fire resistive intumescent coating is halogen free. Halogen free, as defined herein, means that the intumescent coating only contains trace amounts of halogens, or less, and that the coating does not rely upon the presence of halogens for fire resistivity.

A spumific compound decomposes upon thermal exposure to release an expansion gas (e.g., nitrogen, carbon dioxide or water vapor), thereby expanding the char to increase char thickness. Typically, the spumific will off-gas at a temperature at which the cured epoxy resin is soft but which is below the temperature at which carbonaceous char is formed. Thus, char which is formed is expanded and thereby better insulates the substrate as expansion gas is retained within the char. It is preferable that the composition contains a spumific which provides a degree of intumescence (ratio of the volume of intumesced coating to the volume of non-itumesced coating) below 8 when heated according to the UL 1709 test protocol.

Suitable spumifics include, for example, ammonium polyphosphate, THEIC, melamine, methylolated melamine, hexamethoxymethyl melamine, melamine monophosphate, melamine biphosphate, melamine polyphosphate, melamine pyrophosphate, urea, dimethylurea, dicyandiamide, guanylurea phosphate, glycine, and boric acid.

Typically, the weight ratio of spumific agent (or a mixture of spumific agents)-to-epoxy resin in the mastic is usually between about 1:3 to about 2:1, and is preferably between about 2:3 to about 3:2.

In yet another embodiment, at least one type of low density filler is dispersed in the mastic. Typically, the low density filler is used to further reduce the intumescent coating density while also insulating the coated substrate by reducing the thermal conductivity of the intumescent coating and of its resultant char. Examples of suitable low density fillers include expanded glasses, such as expanded perlite, expanded vermiculite and hollow microspheres, for example, glass, ceramic and organic microspheres.

The low density filler should be suitably small in size to freely be sprayed. Preferably, the low density filler has a particle size of less than 0.04 inches.

In a preferred embodiment, the mastic contains expanded perlite having a particle size of 97% through 30 mesh (particle size 0.023 inches) as a filler.

The weight ratio of filler-to-epoxy resin in the mastic is usually between about 1:30 to about 1:5, and is preferably between about 1:20 to about 1:5.

In yet another embodiment, the mastic contains a dispersion of one or more types of fibers. Fibers are added for many purposes, such as (1) to reduce mastic sagging before and during curing by increasing the thixotropic index of the mastic, (2) to reinforce the cured intumescent coating and prevent cracking and shrinkage thereof, (3) to reinforce or strengthen the char formed from the intumescent coating, (4) to further enhance gas retention through physical obstruction and/or increased hydrogen-bonding, and/or (5) to form a phosphorosilicate glass within the char which improves the insulation of the coated substrate and durability of the char.

Typically, fibers having a high surface area are dispersed within the mastic to increase the thixotropic index such that a coating of mastic, sprayed on a vertical surface or overhead (ceiling) surface, will experience no significant movement prior to curing. Suitable high surface area fibers include, for example, ceramic, asbestos, aramid, glass and other fibrillated fibers.

The weight ratio of high surface area fiber-to-epoxy resin in the mastic is usually between about 1:40 to about 1:20, and is preferably between about 1:35 to about 1:20.

Fibers used to form phosphorosilicate glass within the char are typically silicon-containing fibers. Preferably, this fiber is an amorphous mineral fiber that contains silicon dioxide such as mineral wool fiber. The weight ratio of glass-forming fiber-to-epoxy resin in the mastic is usually between about 1:30 to about 1:15, and is preferably between about 1:25 to 1:20.

Fibers, used in the method and composition of this invention, must be short enough and small enough in diameter to pass through the spray nozzle without significant clogging. Further, the use of smaller diameter fibers results in more fiber interlocking within the mastic per unit mass of fiber contained therein. Preferred high surface area and mineral wool fibers are described in Example 1.

In another preferred embodiment, the epoxy-based mastic further includes components that will form, or enhance the formation of, a glass matrix within the char during char formation. Typically, these components include at least one type one fluxing agent which is dispersed within the mastic. Other suitable components include, for example, amorphous silica particles, silicon-containing fibers expanded glass, hollow glass microspheres and phosphorous-containing components.

Upon heating under char-forming conditions, the fluxing agent reacts with at least a portion of the phosphorous-containing component and at least a portion of the silicon-containing component to form an at least partially softened, or liquid, phosphorosilicate glass which expands and foams within the char due to gases released by thermal decomposition of one or more components of the intumescent coating. Examples of suitable fluxing agents include, for example, hydrated boric acid, zinc borate, boron oxide, sodium borate, potassium borate, ammonium borate or borate esters such as butylborates or phenylborates. Other suitable fluxing agents include metal oxides of titanium, molybdenum, calcium, iron, aluminum, zinc and tin.

Typically, the weight ratio of fluxing agent (or a mixture of fluxing agents)-to-epoxy resin in the mastic is usually between about 1:3 to about 2:1, and is preferably between about 1:2 to about 1:1.

To further enhance foaming within the char, at least one blowing agent can be dispersed within the mastic to increase the amount of gas released during char formation. Examples of suitable blowing agents include metal carbonates that will degrade to release carbon dioxide, such as carbonate salts of divalent metals. The preferred blowing agent contains calcium carbonate, such as limestone or Dolomite. The size of blowing agent particles used in the present invention must be small enough to freely flow through a suitable spray nozzle without significant clogging.

Additional components can be added to the mastic to ease formulation of the mastic, such as wetting agents and anti-foaming agents. Further, if the mastic is initially formed into separate parts, it is preferred that each part contain a different colored pigment, such as black pigment or white rutile titanium dioxide.

In an alternate embodiment, the low density intumescent coating further contains a means for reinforcing the intumescent coating, such as are known in the art, for example, wires, mesh or fabric made of metal or one or more fibers. Preferably, the reinforcing means is formed from carbon fiber or from carbon and glass fibers, as is described in U.S. Pat. No. 5,433,991, issued to G. Boyd and G. Castle, and U.S. Pat. No. 5,580,648, issued to G. Castle and J. Gaffney. The teachings of U.S. Pat. Nos. 5,433,991 and 5,580,648 are incorporated herein, by reference, in their entirety.

It is to be understood that various components used in the mastic can serve more than one functions, such as the functions of char-forming agent, spumific, fluxing agent, blowing agent or thixotropic agent.

In a preferred embodiment, the epoxy-based mastic includes between about 25–40 wt. % epoxy resin, 15–20 wt. % curing agent, 2–10 wt. % THEIC, 5–10 wt. % ammonium polyphosphate, 5–15 wt. % fire retardant, 15–30 wt. % hydrated boric acid, 1–4 wt. % expanded glass, 0.5–10 wt. % amorphous mineral fiber and 0.5%–2.5 wt. % amorphous silica particles.

In an even more preferred embodiment, the mastic comprises a mixture of components having approximately the following weight percentages, specifically, 26.5–29.5 wt. % epoxy resin; 6.4–8 wt. % triaryl phosphate ester; 23.7–26.3 wt. % hydrated boric acid; 13–15 wt. % of a fire retardant mixture containing 36% by weight tris-(2-hydroxyethyl) isocyanurate and 64% by weight of ammonium polyphosphate; 1.4–2.8 wt. % perlite; 0.8–1.7 wt. % mineral wool fiber; 0.85–1.8 wt. % ceramic fiber; 0.7–5.0 wt. % fumed silica; 16.5–19.5 wt. % curing agent; and 2.2–3 wt. % calcium carbonate. Examples of said preferred low density mastic are further provided in Examples 1–3.

In the method of the present invention, for forming a low density intumescent coating, the mastic can be formed by mixing its components concurrently, in any order or into separate parts which are then mixed together. However, mixing the epoxy resin with the curing agent, significantly before application of the mastic to the substrate, could result in at least the partial curing of the epoxy resin before application. The components of the mastic are mixed by one or more means suitable to form a substantially homogeneous mixture of the components of the mastic (e.g., resin, curing agent, particulates and fibers), such as a high speed dispersion mixer or a static mixer. It is preferred that the mastic be formed from two separate parts, a first part which contains the epoxy resin and a second part that contains the curing agent.

It is also preferred that the epoxy resin and the curing agent, or the parts containing the same, be mixed immediately prior to or during application, such as by flow through a static mixer, prior to being applied as a spray.

The mastic can then be applied to the surfaces to be coated by any suitable means, such as by troweling or spraying.

It is further preferred that the mastic be applied as a spray of droplets, more preferably in a fan-shaped spray pattern, which are directed towards at least one surface of a substrate to be coated. Suitable droplet size can be formed by directing mastic through a nozzle with diamond shaped spray tip of an inner diameter typically between about 35 and about 47 thousandths of an inch. Other means for forming equivalent-sized droplets, as are known in the art, are also suitable for the method of this invention. Typically, the mastic is pressurized to between about 1000 psi and about 4000 psi.

It is additionally preferred that the mastic parts, such as are in a two part system, are heated to reduce their viscosity and enhance ease of spraying. Typically, the mastic parts are heated to between about 55° C. and about 70° C. More preferably, the mastic parts are heated before spraying to between about 65° C. and about 70° C.

The spray is then usually directed, but not required to be directed, in a back and forth motion across the surfaces to be coated until a suitable thickness of low density mastic coating is deposited on the surface. Typically about 8 mm or less, preferably about 4 mm to 6 mm, of mastic is applied in a single coating. Repeated coatings can be applied to attain the desired coating thickness. Preferably, second coatings are not be applied until the prior coating has set or at least partially cured, typically about 30 minutes to 4 hours.

It is particularly preferred that at least one gas be dispersed with the mastic, or at least one of its parts, prior to applying the mastic. For example, where the mastic is applied by spraying, the parts of the mastic can be contained in separate tanks. The parts of the mastic are then heated and stirred, such as with a paddle or other suitable stirrer, while the tanks are pressurized with a gas (e.g., air), typically to a pressure between about 40 psi to about 80 psi, to disperse additional gas into the mastic parts.

The coating thickness required is inversely proportional to the mass (or heaviness) of metal contained in the substrate to be coated. The larger metal masses require less thick intumescent coatings as the larger masses have greater capacity as heat sinks. Typical substrates include structural components and pipes.

The use of mastic application methods other than spraying will typically result in higher densities for the intumescent coating than would be achieved through spraying.

The invention will now be further and specifically described by the following examples.

EXAMPLE 1

Preparation of the First Part of a Silica-Containing Mastic

The first part of components (hereinafter Part 1) used in forming the CHARTEK™ VII intumescent coating of the present invention, was prepared as follows:

To a steel mixing kettle were added epoxy resin (1702.8 lbs of DER331, purchased from Dow Chemical Company), triaryl phosphate ester (438.3 lbs of ANTIBLAZE® 519, purchased from Albright & Wilson Americas Inc., Richmond, Va.), black pigment (4.5 lbs of VN 6792 purchased from Allied Resin) and polydimethylsiloxane (modified) anti-foaming surfactant (0.45 lbs of SAG 47 purchased from Union Carbide Chemicals and Plastics Company Inc., Danbury, Conn.). The contents of the mixing kettle were then mixed at 750 rpm for 10 minutes by a high speed dispersion mixer (Hockmyer 550L with a 16E blade).

While continuing to mix at 750 rpm, amorphous hydrophobic silicon dioxide fumed silica (67.5 lbs of CAB-O-SIL® TS-720 fumed silica, purchased from Osi Specialties Inc., Danbury, Conn.) was gradually added to the mixing vortex. After the fumed silica was observably wetted, mixing speed was increased to 1200 rpm, after which mixing continued for at least 10 minutes until the fumed silica was sufficiently dispersed to a Hegman Grind between 4 and 7.51 as measured using a Hegman Grind Gauge (purchased from Precision Gage & Tool Co., Dayton, Ohio). Hegman Grind measurements are described in "Reading the Hegman Grind Gauge, *Paint. Oil & Chemical Review*, (Jun. 22, 1950).

Mixing speed was then lowered to 900 rpm and then 675 lbs of a fire retardant mixture, containing 36% by weight tris-(2-hydroxyethyl) isocyanurate (sieved through a 325 mesh) and 64% by weight of ammonium polyphosphate (Hostaflam® AP 422, purchased from Hoechst-Celanese Chemicals), was added and mixed for 10 minutes.

Mixing speed was then raised to 950 rpm. Boric acid (1521.45 lbs purchased from United States Borax & Chemical Corporation, Los Angeles, Calif.) was added with subsequent mixing for 25 minutes.

Subsequently, expanded perlite (45 lbs from Pennsylvania Perlite Corporation, Lehigh Valley, Pa.) was added to the mixing kettle. After mixing for 5 minutes, following the perlite addition, 22.5 lbs of amorphous mineral fiber (InorPhil® 061–60 purchased from Berol Nobel, Inc., Stratford, Conn.) were gradually added into the mixing vortex.

Following completion of the mineral fiber addition, mixing continued for 5 additional minutes, and then, 22.5 lbs of high surface area $Al_2O_3/SiO_2$ ceramic fiber (HSA Fiber, Unifrax, Niagara Falls, N.Y.) were gradually added to the mixing vortex. Mixing continued for 5 minutes after the ceramic fiber addition thereby forming Part 1.

The viscosity of Part 1 in the mixing kettle was then determined at 49° C. and 1 rpm using a Brookfield Viscometer (Model RVT-DV1) with a T-spindle. A suitable viscosity for Part 1 was between about 0.5 to about 3.0 million centipoise.

During the production of Part 1, the mixing blade height may have to be adjusted to maintain a vortex while mixing. Also, throughout the production of Part 1, temperature of the mixture in the mixing kettle was maintained at or below 55° C. to prevent polymerization of the epoxy resin.

Part 1 was then packaged in 6 gallon pails.

EXAMPLE 2

Preparation of the Second Part of a Silica-containing Mastic

The second part of the components (hereinafter Part 2), used in forming the CHARTEK™ VII intumescent coating of the present invention, was prepared as follows:

Amidoamine curing agent (2554 lbs of Ancamide 903MAV purchased from Air Products and Chemicals, Inc., Allentown, Pa.), wetting agent (10 lbs of BYK®-W990 from BYK Chemie, Wallingford, Conn.) and anti-foaming surfactant (0.4 lbs of SAG 47) were added to a mixing kettle and then mixed at 800 rpm, by a high speed dispersion mixer (Hockmeyer 550L with a 16E blade) for 10 minutes.

Mixing speed was then raised to 900 rpm and then 401.2 lbs of milled limestone (HUBERCARB® Q325, J. M. Huber Corporation, Quincy, Ill.) was gradually added to the mixing vortex. After mixing for 5 additional minutes, following the limestone addition, mixing speed was raised to 950 rpm and 461.6 lbs of the ammonium polyphosphate/THEIC mixture of Example 1 were gradually added to the mixing vortex. Mixing continued for 15 minutes after completion of the addition.

The mixing speed was sequentially raised to 1000 rpm, followed by the gradual addition of 76.8 lbs of rutile titanium dioxide pigment (Ti-Pure® R-100, DuPont Co.) to the mixing vortex. After the addition, mixing continued for 5 minutes and then gradual additions were sequentially made to the mixing kettle of perlite (224 lbs), mineral fiber (148.4 lbs) and ceramic fiber (123.60 lbs). After each sequential addition, mixing was continued for 5 minutes to form Part 2. Part 2 was then stored in pails.

EXAMPLE 3

Low Density Intumescent Coating

A low density mastic coating was applied to various substrates by mixing Part 1 and Part 2 using a plural component spray machine (AirTech, Houston, Tex.). The spray machine heated and pumped each part from separate holding tanks through two in-line 12" static mixers and then discharged a fan-shaped mastic spray through a diamond-shaped spray tipped nozzle (41 thousandths of an inch I.D., Graco, Minneapolis, Minn.).

The spray machine heated the parts to temperatures between about 54° C. and about 70° C. to reduce the viscosity of the parts and promote better mixing of the parts and ease of spraying. Prior to and during spraying, the separate parts contained in each holding tank are stirred slowly with a scraper type mixing blade. The holding tanks were pressurized with air to between about 80 and about 50 psi, respectively, for Part 1 and Part 2.

The spray machine also pressurized the mastic entering the nozzle to a pressure between about 2000 psi to 3000 psi.

This spray machine mixed a mastic containing about 71% of Part 1 and about 29% of Part 2.

The spray was then directed in a back and forth motion across the surfaces to be coated until a 4 mm to 6 mm thickness of low density mastic coating was deposited on the surface. Repeated coatings were applied, as necessary, to attain the desired coating thickness. The second coatings were not applied until the prior coating had set or cured.

EXAMPLE 4

Comparative Densities of Intumescent Coatings As Relates to the Inclusion of Fumed Silica The densities of intumescent coatings formed, by hand-mixing and plural spray application described in Example 3, were determined for intumescent coatings formed from the following mastics (1) CHARTEK™ IV epoxy-based mastic (sold by the Textron Systems Corporation, Wilmington, Mass.), (2) CHARTEK™ IV containing 1.11 wt. % fumed silica, and (3) the epoxy-based mastic of example 3, specifically CHARTEK™ VII. Intumescent coating densities were measured using an helium pycnometer. The following results were obtained:

|  | Density (g/cc) | |
| --- | --- | --- |
| Mastic | Hand-Mixed | Sprayed |
| CHARTEK ™ IV | 1.17 | 1.12 |
| CHARTEK ™ IV with fumed silica | 1.12 | 0.94 |
| CHARTEK ™ VII | 1.09 | 1.01–0.84* |

*variations resulted from the use of different nozzle sizes and spray equipment

These results clearly show that using the method of the invention, adding minute amorphous silica particles and spraying the mastic, reduces the density of the intumescent coating below that achieved with other mastics not containing the amorphous silica particles.

EXAMPLE 5

Comparative Densities of Intumescent Coatings As Relates to Pre-Application Stirring of Each Mastic Part Two different formulations of the intumescent coating of the present invention were produced, hereinafter, referred to as Formula No. 1 (mastic produced from TSC formula DE14A) and Formula No. 2 (mastic produced from Batch #9709020439 of Part 1 and Batch #9708020094 of Part 2), generally as described in Examples 1–3.

Each formulation was applied at least twice to aluminum panels using each of two different spray application methods. The spray application methods were identical, and were as generally described in Example 3, with the exception that in the "stirred" method each part of the coating mastic (Part 1 and Part 2) was separately stirred for up to about 2.5 hours at low rpm (about 25–30 rpm) just prior to spraying while in the "non-stirred" method the mastic parts were not stirred just before application. More specifically, in the application method, each part of the mastic (Parts I and II) was loaded into separate heated holding tanks used in the spray equipment. The materials were then heated to about 150° F. without stirring. The holding tanks were pressurized to 80 psi for Part 1 and 48 psi for Part 2 during the heating process. The mastic was then sprayed onto aluminum panels at about 2500 psi pressure and at a mastic temperature of 61° C.

The sprayed mastics were allowed to cure overnight at room temperature and the intumescent coating samples were then removed for analysis.

Each sample was analyzed by helium pycnometer to determine density. The densities of the intumescent coatings as measured were found to vary dependent upon pre-spray mixing of the separate parts of the mastics. Specifically, the density results for the intumescent coating formulations were:

|         | Coating Density (g/cc) | |
| --- | --- | --- |
| Formula | Stirred | Non-Stirred |
| No. 1 | 0.98 | 1.13 |
| No. 2 | 1.03 | 1.16 |

In addition, each sample of Formula No. 2 was visually photographed and analyzed to determine percentage porosity. Specifically, each sample was mounted in an epoxy based casting material and polished to a smooth finish using standard, accepted sample preparation methods. Each sample was then analyzed using Optimas Image Analyzer Software on a PC based computer coupled to an Olympus BH—2 microscope set at 50×magnification, outfitted with a Pulnix Model TM—7CN video camera.

This system captures video images of a sample and measures the relative area percentages of light and dark areas in the captured image. An optical micrometer is used to calibrate the system. The threshold value for light and dark areas to be measured was established by the operator through visual inspection. The software then (Percentage Area Macro) automatically calculated the relative area percentages of light and dark areas corresponding to resin matrix (light) and entrained air (porosity) in the image. The image was then printed out on a laser printer.

The porosity analysis for the samples of Formula No. 1 showed

|  | % Matrix | % Porosity |
| --- | --- | --- |
| Non-Stirred Formula No. 1 | 75 | 25 |
| Stirred Formula No. 1 | 60 | 40 |

Thus, the analysis clearly showed an increase in the amount of entrained gases in the intumescent coating due to the stirring of each part of the mastic prior to application thereby reducing the density of the intumescent coating.

EXAMPLE 6

Comparative Heat Resistances of Intumescent Coatings

The efficacy of the commercially-sold, higher density intumescent coating CHARTEK™ IV (sold by the Textron Systems Corporation, Wilmington, Mass.) and the low density intumescent coating of Example 3, specifically CHARTEK™ VII, in resisting heat transfer across the coatings were measured in accordance with "The Hydrocarbon Fire Resistance Test for Elements of Construction for Offshore Installations", Test Specification Issue I (January 1990), by the United Kingdom's Department of Energy.

Prior to running this test, the mastic for each intumescent coating was sprayed onto a separate test column and then cured. Each test column consisted of a 6 foot tall I-beam cut from W10X49 steel stock. The heaviness (Hp/A) of each column, indicating its thermal heat sink capacity, was about 157 per meter. HK-1™ carbon glass knitted mesh (Textron Systems Corporation, Wilmington, Mass.) was installed at mid-depth in the coatings by placing the mesh in the resin while applying the coating. The average coating thickness measured on the CHARTEK™ IV coated column (hereinafter $C_{C4}$) and CHARTEK™ VII coated column (hereinafter $C_{C7}$) were each found to be 15 mm. On each column, coating thickness was measured at 4 locations on each of the eight surfaces of the column to obtain the average thickness (32 measurement locations). to measure coating thickness, at each measurement point holes were drilled into the coating up to, and perpendicular to, the column surface. Coating thickness was then measured with a pin gauge.

Each test column was instrumented with CHROMEL-ALUMEL thermocouples at the locations shown in FIG. 1. The placement of the thermocouples was in accordance with British Standard 476.

The mass of CHARTEK™ IV on column $C_{C4}$ was determined to be about 110 lbs. The mass of CHARTEK™ VII on column $C_{C7}$ was found to be about 87 lbs. The coated surface areas for each column were equivalent. Thus, the mass of CHARTEK™ VII required to coat the test column to a depth of 15 mm was substantially less (approximately 20%) than that mass of CHARTEK™ IV required to coat an identical test column also to a depth of 15 mm.

The columns $C_{C4}$ and $C_{C7}$ were then hydrocarbon fire resistance tested in a furnace at Warrington Fire Research Center Ltd., Warrington, United Kingdom. The fire resistance test was conducted according to the Norwegian Petroleum Directorate fire curve requirement that the furnace temperature achieve 1100° C. within approximately 20 minutes and that the furnace temperature remains at about 1100° C. for the duration of the test. During the test, the coatings started intumescing upon heating and continued intumescing until the steel temperature was about 350° C.

The results of this fire test are provided in The FIGURE. These results showed that an equal thickness, but smaller mass, of the low density intumescent coating of the present invention (CHARTEK™ VII), which has a formulation that is generally equivalent to CHARTEK™ IV, was equally as effective in insulating a steel I-beam from high temperatures as was an equal thickness, but higher mass, of CHARTEK™ IV. Therefore, a CHARTEK™ VII coating provided equal insulation of the steel test column from an external heat source the furnace), than did the CHARTEK™ IV coating, while adding 20% less coating weight to the test column than did CHARTEK™ IV.

EXAMPLE 7

Comparison of Protection Weights of Intumescent Coatings

Equivalent steel components having various structural shapes and sizes, and having heavinesses (Hp/A) ranging from 30 per meter (for large components) to 250 per meter (for small components), were coated with either CHARTEK™ IV or CHARTEK™ VII. These coated components were then subjected to hydrocarbon fire resistance testing, as described in Example 6, to determine the protection weight (kg of coating/m² surface area) of coating required to limit steel temperature to 400° C. for 1 hour, 2 hour and 3 hour duration tests. The results of these tests are provided in the following table.

These tests results show that substantially less mass of the CHARTEK™ VII coating of the present invention provides a heat resistance (insulation) equivalent to that of a higher weight coating of CHARTEK™ IV for various sized and shaped steel components.

| | PROTECTION WEIGHTS (Kg/m²) FOR DIFFERENT DURATION TESTS | | | | | |
|---|---|---|---|---|---|---|
| Hp/A | 1-Hour Rating | | 2-Hour Rating | | 3-Hour Rating | |
| (m⁻¹) | $PW_{VII}$ | $PW_{IV}$ | $PW_{VII}$ | $PW_{IV}$ | $PW_{VII}$ | $PW_{IV}$ |
| 30 | 4 | 4.5 | 7 | 9 | 10 | 13.4 |
| 50 | 5 | 6.7 | 9 | 12.3 | 14 | 19 |
| 70 | 6 | 7.8 | 11 | 15.7 | 17 | 23.4 |
| 90 | 7 | 9 | 13 | 16.8 | 19 | 21.3 |
| 110 | 7 | 9 | 14 | 19 | | |
| 130 | 8 | 10.1 | 15 | 20.2 | | |
| 150 | 8 | 10.1 | 16 | 21.3 | | |
| 170 | 8 | 10.1 | 16 | 21.3 | | |
| 190 | 9 | 11.2 | 17 | 22.4 | | |
| 210 | 9 | 11.2 | 17 | 22.4 | | |
| 230 | 9 | 11.2 | 18 | 23.5 | | |
| 250 | 9 | 11.2 | 18 | 23.5 | | |

Note:
CHARTEK ™ IV LLOYD'S CERTIFICATE NO. SVG/F93/361
CHARTEK ™ VII LLOYD'S CERTIFICATE NO. SAS/F96/477

Equivalents

Those skilled in the art will recognize, or be able to ascertain using no more than routine experimentation, many equivalents to specific embodiments of the invention described specifically herein. Such equivalents are intended to be encompassed in the scope of the following claims.

What is claimed is:

1. A low density, epoxy-based intumescent fire resistive coating having a density of about 1.0 g/cm³ or less.

2. The low density intumescent coating of claim 1 wherein said coating is halogen free.

3. A halogen free, epoxy-based intumescent fire resistive coating.

4. A low density intumescent coating of claim 1, further comprising a means for reinforcing the intumescent coating that is disposed within said coating.

5. An intumescent coating of claim 4 wherein the means for reinforcing is a mesh comprising carbon fiber.

6. A low density epoxy-based intumescent fire resistive coating, comprising:
   a) at least one cured epoxy resin;
   b) minute, hydrophobic, amorphous silica particles;
   c) at least one char-forming agent; and
   d) at least one spumific.

7. A coating of claim 6, further comprising at least one type of gas dispersed therein.

8. A coating of claim 6, further comprising fibers.

9. A coating of claim 8 wherein said fibers comprise silicon-containing fibers.

10. A coating of claim 8 wherein said fibers are high surface area fibers.

11. A coating of claim 6, further comprising particles of expanded glass.

12. A coating of claim 6, further comprising hollow microspheres.

13. A coating of claim 6 wherein the char-forming agent comprises a phosphate-containing fire retardant.

14. A coating of claim 6 wherein the spumific comprises an isocyanurate.

15. An intumescent fire resistive mastic used to form a low density fire resistive coating on at least one surface of a substrate, comprising:
   a) at least one epoxy resin;
   b) at least one epoxy curing agent;
   c) minute, hydrophobic, amorphous silica particles;
   d) a phosphate-containing fire retardant; and
   e) at least one spumific.

16. A mastic of claim 15, further comprising at least one gas dispersed therein.

17. An intumescent fire resistive mastic used to form a low density fire resistive coating on a substrate, comprising:
   a) at least one epoxy resin;
   b) at least one epoxy curing agent;
   c) minute, hydrophobic, particles of amorphous silica;
   d) a phosphate-containing fire retardant;
   e) at least one spumific;
   f) particles of expanded glass; and
   g) silicon-containing fibers.

18. A mastic of claim 17, further comprising at least one gas dispersed therein.

19. A method for forming a low density, intumescent fire resistive coating, comprising:
   a) forming an epoxy-based intumescent mastic, wherein minute, hydrophobic, amorphous silica particles are dispersed within said mastic; and
   b) spraying the mastic onto at least one surface of a substrate to form a low density mastic coating on said surface, whereupon said mastic coating then cures to form a low density intumescent fire resistive coating.

20. A method of claim 19 wherein the mastic has at least one type of gas dispersed within the mastic to reduce the density of the intumescent coating.

21. A method for reducing the density of an epoxy-based intumescent fire resistive coating, while maintaining significant fire resistivity, comprising:
   a) forming an epoxy-based intumescent mastic, wherein minute, hydrophobic, amorphous silica particles are dispersed within said mastic, and wherein at least one type of gas is dispersed within the mastic to reduce the density of the intumescent coating; and
   b) spraying the mastic onto at least one surface of a substrate to form a low density mastic coating on said surface, whereupon said mastic coating then cures to form a low density intumescent fire resistive coating.

22. The method of claim 21, wherein the epoxy-based intumescent mastic is processed in a tank with a pressurized gas environment before spraying.

23. The coating of claim 6, wherein the minute, hydrophobic, amorphous silica particles have an average diameter of less than about one micron.

24. The coating of claim 6, wherein the minute, hydrophobic, amorphous silica particles have an average particle size between about 3 and about 500 nanometers.

25. The coating of claim 9, further comprising pearlite.

* * * * *

UNITED STATES PATENT AND TRADEMARK OFFICE
CERTIFICATE OF CORRECTION

PATENT NO. : 6,096,812
DATED : August 1, 2000
INVENTOR(S) : Joseph W. Hanafin; David C. Bertrand It is certified that error appears in the above-identified patent and that said Letters Patent is hereby corrected as shown below:

In column 14, line 65, claim 25, please change "claim 9" to -- claim 6 --.

Signed and Sealed this

Twenty-fourth Day of April, 2001

Attest:

NICHOLAS P. GODICI

*Attesting Officer*   *Acting Director of the United States Patent and Trademark Office*